March 8, 1955 W. SEDUTTO 2,703,538
APPARATUS FOR FORMING FROZEN PRODUCTS
Filed March 27, 1953 2 Sheets-Sheet 2
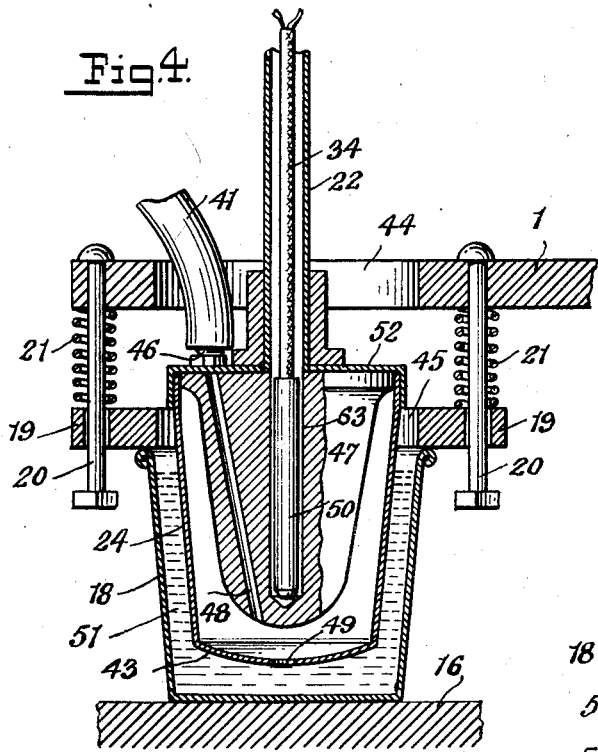
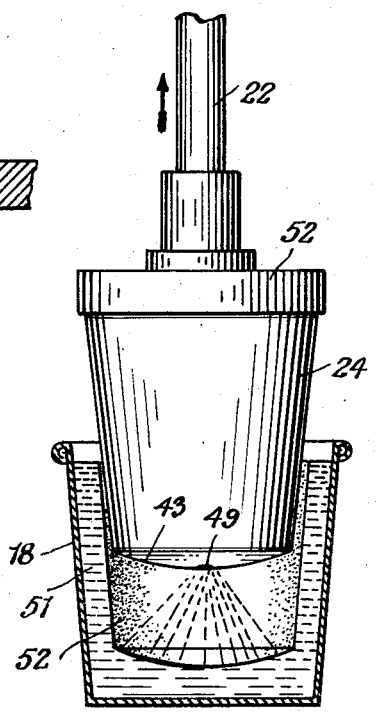
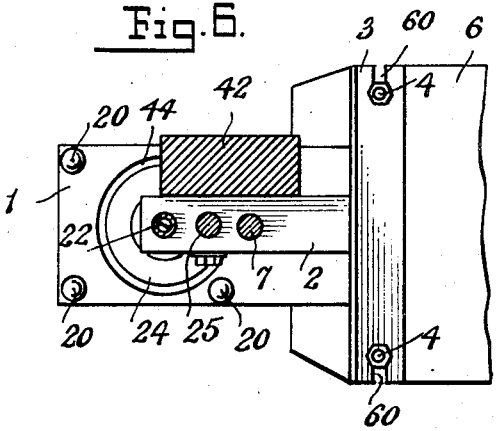
INVENTOR.
William Sedutto
BY
ATTORNEY

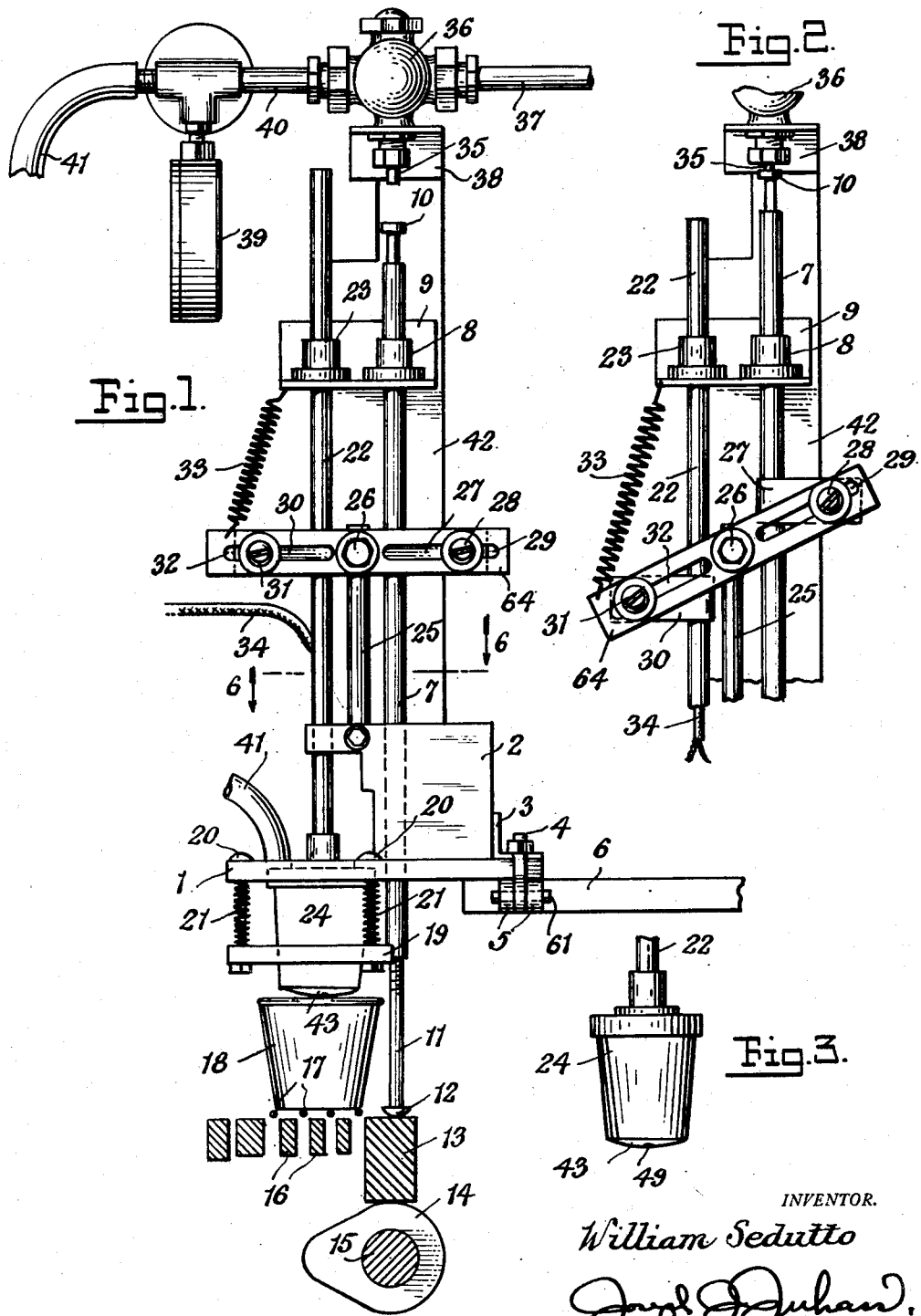

2,703,538

APPARATUS FOR FORMING FROZEN PRODUCTS

William Sedutto, New York, N. Y., assignor to The Sedutto Company, Staten Island, N. Y.

Application March 27, 1953, Serial No. 344,939

7 Claims. (Cl. 107—8)

This invention relates to an apparatus for forming frozen products, such as ice cream, water-ice, sherbet, custard and the like in individual servings or units, and particularly when such servings or units are to be composed of different flavors, or a combination of different substances. It is an object of the invention to provide a means and method by which the filling of cups or other forms of receptacles or molds will be speedily performed, and in a manner to permit of the filling of a plurality of different flavors or different materials into the molds or cups.

In the previous manufacture of frozen products in the form of individual servings or units, and wherein each serving or unit consisted of several flavors or of a number of different substances, numerous disadvantages were encountered. One of the methods in use involved the manual formation of a cavity in a mold that had been partly filled with one flavor of ice cream or other frozen food, and the subsequent deposit of a second flavor in the cavity thus formed. Another method involved the use of double molds, and the removal of an inner mold to form the cavity for the reception of the second flavor or other substance.

These methods were slow in operation; they were sometimes insanitary and they often increased refrigeration costs, wasted the products, and possessed numerous other deficiencies.

The objects of the present invention are to provide a speedy economical means for filling molds with different substances, and particularly in forming a concavity in one substance in the mold for the reception of a second substance; for enabling a composite body of the frozen product to be produced for serving in a package which does not require re-packaging after the completion of the process, and to provide a continuous process by which the composite servings can be speedily, sanitarily and uniformly produced.

With these and other objects to be hereinafter set forth in view, I have devised the arrangement of parts to be described and more particularly pointed out in the claims appended hereto.

In the accompanying drawings, wherein an illustrative embodiment of the invention is disclosed.

Fig. 1 is a side elevation with certain parts in section, and other parts shown fragmentarily, of an apparatus made in accordance with the invention;

Fig. 2 shows parts of the apparatus in position to produce the air blast;

Fig. 3 is a side elevation of the forming die or plunger head;

Fig. 4 is a vertical sectional view through the forming die or plunger head, showing the same in position within a mold cup and producing the required concavity therein;

Fig. 5 shows the forming die or plunger head receding from the interior of the mold cup and the blast of air being produced in the cavity formed in the ice cream or other frozen product in the cup; and Fig. 6 is a sectional view, taken substantially on the line 6—6 of Fig. 1, looking in the direction of the arrows.

In the drawings, 1 indicates a base plate, on top of which is secured a guide block 2. At one end, the base plate 1 and guide block 2 are secured to a transversely extending angle-bar 3 which is secured by swing-bolts 4 to a supporting member 6 forming a rigid portion or extension of a filling machine to which the present apparatus is attached. The swing bolts 4 are pivoted on pins 61 in the ears 5, and enter through the slot 60 provided at the opposite ends of the angle-bar 3. Extending upwardly from the base plate 1 and block 2 is an upright or post 42.

Adapted for vertical reciprocating movement through the guide block 2 is an elevating rod 7 which is slidably guided through said block 2 and also through a sleeve 8 secured on the horizontal flange of an angle bracket 9 attached to the upright or standard 42. At its upper end, the rod 7 is provided with an adjustable head or tappet 10 adapted to open an air valve 36 at the proper time, in a manner to be described.

At its lower end, the elevating rod 7 is provided with an adjustable stem 11 having a head 12 which rests on a part 13 of a mold elevator that also includes the spaced bars 16. The parts 13 and 16 are portions of a known mold-conveying and elevating means conventionally used in ice cream filling-machines. A shaft 15 is rotatively mounted below the part 13 and said shaft 15 carries a cam 14 which raises the part 13 and part 16 at the proper time to cause a mold cup 18 to be elevated in a manner to be described. The conveying means 17 for the mold cups includes a travelling wire-belt conveyor composed of a plurality of parallel spring wire elements 17 on which the mold cups 18 rest and are transported from one station to the next. The elements 13 and 16 of the cup-elevator are spaced apart as shown in Fig. 1, so that these parts may raise the cup from off the conveyor belt members 17 when required, and support the cup during the cavity-forming operation to be described.

The plunger for forming a cavity in a partially filled mold cup 18, includes a vertically reciprocable piston-rod 22 which is slidably guided through the guide block 2 and through a sleeve 23, the latter being mounted on the horizontal flange of the angle bracket 9. The forming die or plunger head 24 is located at the lower end of the piston-rod 22 and the same is composed of a hollow body of the shape illustrated, closed at the top by the cap 52. In the illustrative embodiment shown, the die is of slightly conical shape or is tapered from top to bottom to facilitate its removal from the cavity 52 (Fig. 5), which it forms in the ice cream 51 contained within the mold cup 18. It will be apparent however, that the particular shape, length and general proportions of the forming die 24 may be varied according to the size and shape of the mold cup 18 into which the die 24 is to enter, and also the size and shape of the cavity 52 to be formed in the ice cream 51 in the mold cup.

In the form shown, the body of the forming die is provided with a slightly convex bottom 43 formed with a central opening 49 through which an air blast is directed. Contained within the body of the forming die 41 is a nozzle member 47 (Fig. 4) having a central recess 63 within which is contained a heating unit 50 connected to wiring 34 which extends upwardly through the hollow interior of the rod 22. The wiring 34 emerges from the rod 22 at a suitable point and connects to a source of electric current to thereby heat the heating unit 50 which transmits its heat to the nozzle 47 which conveys the heat to the forming die 24 and keeps the same at a required temperature. Thermostatic control of known construction may be employed to so maintain the heat in the forming die at the required temperature.

Extending through the nozzle 47 is an air passage 48 which connects at its upper end to a nipple 46 located exteriorly of the forming die, said nipple 46 being connected to one end of a flexible tube 41 which extends upwardly and attaches to piping 40 attached to an air valve 36. Valve 36 is secured on an angle bracket 38 located at the upper end of the upright 42. The air valve 36 is provided with a stem 35 which is in vertical alignment with the head or tappet 10 of the elevator rod 7. The valve 36 is normally maintained closed and is opened only when the elevator rod 7 is raised sufficiently to cause the head or tappet 10 to contact with the stem 35 and open the valve. This position of the parts is illustrated in Fig. 2. The valve 36 is connected to the pipe 37 which extends from a suitable source of air under pressure. A gauge 39 is used in the air line to enable a constant and required air pressure to be maintained. The lower end of the passage 48 establishes communication with the interior of the forming die and also with the outlet opening 49 so that an air blast will be caused to emanate from opening 49 upon the valve 36 being opened.

When the elevator rod 7 is elevated by the action of the cam 14, the piston rod 22 will be moved downwardly, and this result is attained by the employment of a rocker bar 64. This rocker bar is pivoted at a central point on the pivot pin 26 which is supported at the upper end of a fixed vertical post 25, said pin being also inserted for rigidity into or through the upright 42. Fixedly secured to the piston rod 22 is a laterally-extending lug 30 which carries a pin 31 projecting through a longitudinal slot 32 formed in the rocker bar 64. The elevator rod 7 also carries a laterally-extending lug, shown at 27, provided with a pin 28 which extends through a longitudinally-extending slot 29 formed in the rocker bar 64. A coil spring 33 has one end attached to the rocker bar 64 and its other end connected to the angle bracket 9 and the spring 33 serves to hold the head 12 of the elevator rod 7 in constant contact with the part 13 of the mold elevator.

Located below the base plate 1 and suspended upon four pins 20 is a spring-pressed pressure plate against which the upper end of the mold cup 18 abuts when said cup is elevated by the mold elevator 13, 16 as shown in Fig. 4. Coil springs 21 surround the pins 20 and resiliently resist the raising movement of the plate 19 when the mold cup is elevated. This spring-pressed plate 19 also tends to urge the mold cup 18 away from the forming die 24 as the elevator is lowered and as the forming die is moved upward and out of the cavity 52 formed by it in the ice cream 51 in the mold cup 18. The plate 19 is provided with a circular opening 45 and a similar opening is provided at 44 in the base plate 1 and the forming die 24 passes through these aligned openings in its raising and lowering movements.

From the foregoing, the operation of the improved apparatus and method will be readily understood. The molds 18 are usually in the form of metal cups of desired shape and size and the same are moved along on the spring belt conveyor 17 to a filling station where the same each receive a charge of ice cream to partially fill the cup. Each partly-filled cup is then carried by the conveyor 17 to a point below the forming die 24 to successively present the cups in position to enable a concavity to be formed in the ice cream in each cup as it reaches a position below the forming die 24. As a cup reaches a point below the forming die 24, the elevator 13, 16 rises, lifting the cup 18 from the conveyor 17 and bringing its rim or upper edge into contact with the pressure plate 19 and elevating the plate 19 against the pressure of the springs 21. As the mold elevator moves upwardly, the elevator rod 7 is raised, and the same, through the medium of the rocker bar 64, lowers the piston rod 22 and causes the heated forming die 24 to enter into the mold cup 18 and form the cavity 52 in the ice cream 51 then in the mold cup 18. The forming die 24 will be caused to enter the mold cup to the required depth according to the desired depth of the cavity to be produced in the ice cream 51. After the die 24 is inserted to the required depth and is about to start an upward or receding movement, a blast of air will be ejected through the opening 40 into the cavity 52 formed in the ice cream 51 contents of the mold cup. This air blast will tend to break the vacuum in the cavity and will destroy adhesion between the forming die and the ice cream in the cup, while tending to hold the formed cavity against collapse while the forming die is being withdrawn. The blast of air emitted from the forming die will, of course, be attained by the lifting movement exerted on the valve stem 35 by the head or tappet 10 on elevator rod 7 in proper timing with respect to the movements of the forming die. After the cavity 52 is formed as above described, the elevator will be lowered to bring the mold cup 18 down on the conveyor belt 17 which will then transport it to the next filling station whereat the cavity 52 formed in the ice cream will be filled with the desired substance.

While I have herein described one embodiment of the invention, it will be obvious that changes may be made in the same without departing from the spirit of the invention. For example, the shape and size of the forming die might be materially changed according to the size and shape of the cavity to be produced in the ice cream; a rotative movement might be imparted to the forming die as it enters and/or leaves the mold cup if it is found desirable to do so, and many other changes may be made as comprehended by the scope of the claims appended hereto.

What I claim is:

1. An apparatus of the character described comprising conveying means for moving a cup-shaped mold, elevating means for raising the mold from the conveying means, a vertically-reciprocable plunger provided with a forming die on its lower end, means operatively engaged with said plunger for raising and lowering the plunger and its forming die to thereby bring said forming die into the mold on the descent of the plunger and raise the same out of the mold upon the ascent of the plunger, means for heating the forming die, an air supply connected to the forming die, a valve for controlling the flow of air to the forming die, said first named means adapted to open said valve after the die is inserted to the required depth in the mold and is about to start an upward movement from the mold, the forming die having an aperture from which the air is directed into the cavity in a frozen product contained within the mold.

2. An apparatus for forming a cavity in a frozen product comprising, a movable mold support, means for causing raising and lowering movements of said support, a spring-pressed plate against which a mold is urged upon raising movements of the support, said plate having an aperture, a plunger carrying a forming die adapted to be lowered into said aperture and into the mold while the mold is confined between said spring-pressed plate and its support, means for operating said plunger, means for heating the forming die and means operated by the plunger operating means for forcing an air blast through the forming die and into the mold after the forming die has descended into the mold and has formed a cavity in a product contained in the mold and is about to start an upward movement from the mold.

3. An apparatus of the character described comprising, conveying means for moving and supporting a cup-shaped mold, elevating means for raising the mold from the conveying means, a vertically reciprocating plunger, cam operated means coacting with said plunger for causing elevation and descent of the plunger, the plunger carrying a forming die on its lower end and bringing said die down for a predetermined distance into the mold, a valve for controlling the flow of air to the forming die, means automatically operable upon the operation of the cam-operated means for opening said valve after the die is inserted to the required depth in the mold and is about to start upward movement from the mold, said cam operated means including a shaft being movable upwardly while the plunger is being moved downwardly, the forming die having an aperture from which the air is directed into a cavity in a frozen product formed in the mold.

4. An apparatus of the character described comprising a fixed support, a spring-pressed plate hung from said support, said plate being provided with a central aperture, conveying means for moving a cup-shaped mold and locating the same below the aperture in the plate, said aperture being smaller than the mouth of the mold, elevating means for lifting the cup from the conveying means and bringing the upper edge of said mold into contact with the plate and in axial alignment with the aperture, a vertically reciprocating plunger in axial alignment with the aperture, a forming die carried on the end of the plunger and entrant through the aperture and into the mold for a predetermined distance, means for raising and lowering the plunger and its forming die to thereby bring the forming die into the mold upon the descent of the plunger and to raise the same out of the mold upon the ascent of the plunger, means for heating the forming die, an air supply conduit connected to the forming die, a valve for controlling the flow of air through said conduit, the plunger operating means movable upwardly while the plunger is movable downwardly for opening the valve after the die is inserted to the required depth in the mold and is about to start an upward movement from the mold, the forming die having an aperture from which air is directed into a cavity formed by the die in a frozen product contained in the mold.

5. In an apparatus of the character described, supporting means for a cup-shaped mold, a spring-pressed plate against which the mouth of the mold is held, the plate having an aperture in registration with the mouth of the mold and of smaller size than said mouth, a plunger movable through the aperture to bring its lower end into the mold for a predetermined distance, said lower end of the plunger being in the form of a die, an air conduit and a valve therein for controlling air flow to the die, a push-rod for opening the valve upon raising movement of the push-rod, cam means for raising the push-rod, a pivoted rocking bar having one end connected to the push-rod and its other end connected to the plunger whereby elevating movement of the push rod by the cam means will cause descent of the plunger and lowering of the die through the aperture and into the mold, the forming die having a passageway communicating with the air conduit and an aperture from which the air is directed into a cavity formed by the die in a frozen product contained within the mold.

6. An apparatus for forming a cavity in a frozen product, a cup-shaped mold, a support for the mold, a vertically reciprocating plunger having a forming die at its lower end with the mold positionable therebeneath, a vertically reciprocating rod adjacent the plunger, operative connections between the plunger and rod whereby the forming die is lowered into the mold upon upward movement of the reciprocating rod, an air conduit in communication with said die and a valve in said conduit operated by said reciprocating rod after the die is inserted to the required depth in the mold and is about to start an upward movement from the mold for discharging a controlled blast of air into the cavity in a frozen product in said mold.

7. Apparatus as in claim 6, wherein heating means is in communication with the forming die to free the forming die from a frozen product in the mold.

References Cited in the file of this patent

UNITED STATES PATENTS

| | | |
|---|---|---|
| 896,056 | Colborne | Aug. 11, 1908 |
| 1,707,816 | Sachs | Apr. 2, 1929 |
| 1,793,089 | Heyes et al. | Feb. 17, 1931 |
| 2,534,059 | Ricciardi | Dec. 12, 1950 |
| 2,624,296 | Nuttall | Jan. 6, 1953 |

FOREIGN PATENTS

| | | |
|---|---|---|
| 385,035 | Great Britain | Dec. 22, 1932 |
| 603,266 | Great Britain | June 11, 1948 |